US008892474B1

(12) United States Patent
Inskeep et al.

(10) Patent No.: US 8,892,474 B1
(45) Date of Patent: Nov. 18, 2014

(54) VIRTUAL PURCHASING CARD TRANSACTION

(75) Inventors: Todd Inskeep, Charlotte, NC (US); George C. Schroth, Scranton, PA (US); Robert Timothy Leedy, Jr., Belmont, NC (US); David Shroyer, Charlotte, NC (US); Xu He, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 12/721,988

(22) Filed: Mar. 11, 2010

(51) Int. Cl.
G06Q 20/00 (2012.01)
G06Q 20/36 (2012.01)

(52) U.S. Cl.
CPC .................... G06Q 20/3674 (2013.01)
USPC ................................ 705/67; 705/44

(58) Field of Classification Search
CPC ............................. G06Q 20/3674; G06F 21/34
USPC ................ 705/34, 39, 44, 67; 370/338; 726/9
See application file for complete search history.

(56) References Cited

U.S. PATENT DOCUMENTS

| | | | |
|---|---|---|---|
| 5,221,838 A | 6/1993 | Gutman et al. | |
| 5,521,362 A | 5/1996 | Powers | |
| 5,923,016 A | 7/1999 | Fredregill et al. | |
| 6,980,968 B1 | 12/2005 | Walker et al. | |
| 7,003,495 B1 | 2/2006 | Burger et al. | |
| 7,069,001 B2 | 6/2006 | Rupp et al. | |
| 7,107,247 B2 | 9/2006 | Kinoshita et al. | |
| 7,127,606 B2 | 10/2006 | Wheeler et al. | |
| 7,548,884 B1 | 6/2009 | Thomas | |
| 2002/0062249 A1 | 5/2002 | Iannacci | |
| 2002/0095389 A1* | 7/2002 | Gaines | 705/67 |
| 2003/0172040 A1 | 9/2003 | Kemper et al. | |
| 2005/0187883 A1 | 8/2005 | Bishop et al. | |
| 2006/0064372 A1 | 3/2006 | Gupta | |
| 2006/0178180 A1 | 8/2006 | Jung et al. | |
| 2007/0136192 A1 | 6/2007 | German et al. | |
| 2007/0291710 A1* | 12/2007 | Fadell | 370/338 |
| 2008/0005037 A1 | 1/2008 | Hammad et al. | |
| 2008/0048022 A1 | 2/2008 | Vawter | |
| 2008/0154757 A1 | 6/2008 | Barros et al. | |
| 2008/0184339 A1* | 7/2008 | Shewchuk et al. | 726/9 |
| 2008/0289020 A1* | 11/2008 | Cameron et al. | 726/9 |
| 2009/0094125 A1* | 4/2009 | Killian et al. | 705/35 |
| 2010/0050233 A1 | 2/2010 | Ross | |
| 2010/0058435 A1* | 3/2010 | Buss et al. | 726/1 |
| 2010/0088149 A1 | 4/2010 | Sullivan et al. | |
| 2010/0114776 A1 | 5/2010 | Weller et al. | |
| 2010/0125495 A1 | 5/2010 | Smith et al. | |
| 2010/0138344 A1 | 6/2010 | Wong et al. | |
| 2010/0205091 A1* | 8/2010 | Graziano et al. | 705/40 |
| 2010/0280911 A1 | 11/2010 | Roberts et al. | |

OTHER PUBLICATIONS

DACS Self-Issued InfoCard Demonstration https://dacs.dss.ca/infocard-demo/selfissued.html Retrieved on Feb. 9, 2010.

(Continued)

*Primary Examiner* — Ryan Zeender
*Assistant Examiner* — Hunter Wilder
(74) *Attorney, Agent, or Firm* — Weiss & Arons LLP; Michael A. Springs, Esq.

(57) ABSTRACT

Apparatus and methods for the execution of a transaction between a customer and a merchant using a virtual purchasing instrument. The apparatus and methods may involve receiving from the customer a request to pay funds or draw credit from an account based on the customer's electronic presentation of the virtual purchasing instrument to the merchant.

15 Claims, 11 Drawing Sheets

(56) References Cited

OTHER PUBLICATIONS

DACS Managed InfoCard Demonstration https://dacs.dss.ca/infocard-demo/managed.html Retrieved on Feb. 9, 2010.
Claim Catalog http://wiki.informationcard.net/index.php/Claim_Catalog Retrieved on Feb. 9, 2010.
Craig Burton, The Information Card Ecosystem: The Fundamental Leap from Cookies and Passwords to Cards and Selectors (Information Card Foundation, Apr. 2009) Needham MA.
CardGears BankCard demo http://www.bankcarddemo.com Retrieved on Feb. 9, 2010.
Random House Dictionary 2012, Definition of "Issue", Random House, Inc., 2012, New York, NY.

\* cited by examiner

900

Choose Account(s) for which you Would Like a Virtual Payment Instrument:

○ BankCo Travel Card Platinum  xxxx  xxxx  xxxx  xxxx

○ BankCo Charge It                       xxxx  xxxx  xxxx  xxxx

Claims Disclosure

Your BankCo Virtual Payment Instrument ("VPI") will Provide to any Relying Party the Following Information:

- 1002 • VPI Holder Name          John S. Doe
- 1006 • VPI Number               1234 5678 1234 5678
- 1008 • VPI Expiration Date      December 31, 2020
- 1004 • VPI Billing Address      1 Main St.
                                  Centertown, XL

FIG. 10

Acme Products
On-Line Checkout ⟵ 1312 ⟵ 1314

Shopping Cart

| Sku ⟵1302 | Description ⟵1304 | Qty 1306 | Regular Price 1308 | Loyalty Program A Discounted Price | E-coupon Program A Discounted Price | Amount 1310 |
|---|---|---|---|---|---|---|
| 1 | 16 oz Ketchup | 1 | 2.49 | 2.39 | - - | 2.39 |
| 2 | Puppy Cuisine 5 lb | 3 | 6.97 | - - | - - | 20.91 |
| 3 | Shiny Brite Detergent 128 oz | 1 | 8.49 | - - | 8.00 | 8.49 |
| Total: | | | | | | 31.79 |

Select Payment Method: ⟵1316

○ Credit / Debit Card
    ○ Online Payment Service X
1318⟶ ○ Virtual Payment Instrument

VIRTUAL PURCHASING CARD TRANSACTION

FIELD OF TECHNOLOGY

Aspects of the disclosure relate to providing apparatus and methods for executing electronic transactions and communicating transaction-related information. In particular, the disclosure relates to apparatus and methods for executing a transaction with a virtual transaction card.

BACKGROUND

In a typical electronic credit-card-based transaction, a customer (the "customer") purchases from a merchant or service provider ("the merchant") goods or services ("the goods") using credit. The customer and the merchant exchange transaction information via a series of web pages. The merchant provides the customer with a web form. The customer provides the merchant with customer information and billing information. The customer information typically includes identity information. The billing information typically includes financial institution account information.

When the transaction is based on credit, the credit is extended to the customer by an issuing bank (the "issuer"). The merchant presents a debit to an acquiring bank (the "acquirer"). The acquirer pays the merchant for (and thus "acquires") the goods. A transaction processing network in communication with the issuer and the acquirer settles the transaction between the issuer and the acquirer. The transaction processing network may collect transaction processing network fees from the issuer and the acquirer in connection with the settlement.

The issuer may impose upon the acquirer a fee for participating in the transaction. The fee may be referred to as "interchange." Interchange may be a fixed fee for the transaction or a percentage of the transaction. Interchange flows from the acquirer, through the transaction processing network, to the issuer. The issuer typically uses interchange to cover costs of acquiring credit card customers, servicing credit card accounts, providing incentives to retain customers, mitigating fraud, covering customer credit risk, group comp and other expenses.

The acquirer may deduct a "transaction fee" from the amount that the acquirer pays the merchant in exchange for the goods. The transaction fee may cover the acquirer's transaction processing network fee, interchange, and other expenses. The acquirer may obtain a profit from the transaction fee.

FIG. 1 shows typical credit card transaction settlement flow 100. Flow 100 involves transaction participants such as a merchant, a customer, and transaction service providers that are identified below.

At step 1, the merchant provides transaction information related to a proposed transaction between the merchant and a customer to a transaction authorization and clearance provider. The transaction authorization and clearance provider may provide transaction authorization and clearance information to the merchant. The transaction authorization and clearance information may include authorization for the transaction to proceed.

At step 2, the merchant provides $100 in goods to a customer. The customer pays with a credit card.

At step 3, the issuer transmits to the customer a statement showing the purchase price ($100.00) due. The issuer collects the purchase price amount, along with interest and fees if appropriate, from the customer.

At step 4, the issuer routes the purchase price amount ($100.00) through the transaction processing network to the acquirer.

At step 5, the acquirer partially reimburses the merchant for the purchase price amount. In the example shown in FIG. 1, the partial reimbursement is $98.00. The difference between the reimbursement amount ($98.00) and the purchase price amount ($100.00) is a two dollar ($2.00) transaction fee.

At step 6, the acquirer pays an interchange amount ($1.50), via the transaction processing network, to the issuer.

At step 7, both the acquirer and the issuer pay a transaction processing network fee ($0.07 for acquirer and $0.05 for the issuer) to the transaction processing network.

Transaction processing networks and transaction processing network services offered under the trademarks VISA, MASTERCARD, NYCE and PULSE are known. Transaction processing networks typically set interchange rates. Interchange rates often depend for each transaction processing network on merchant type and size, transaction processing method and other factors. Some transaction processing networks set rules that prohibit merchants from charging an incremental fee for credit card payments, establishing minimum or maximum purchase price amounts or refusing to accept selected cards.

The merchant typically requires customer and billing information that is nearly the same as that required by other merchants. Customers that shop online typically shop using websites provided by several different merchants. Each transaction requires the customer to enter customer and billing information that is in whole or in part the same as the customer and billing information that is required for other merchants. Provision of wholly or partially identical information to different merchants is time-consuming and prone to error.

An individual may use a virtual identification cards to electronically provide identity information to another party. Typically, such a card includes one or more "claims" that assert facts about the individual's identity or other aspects of the individual's life. The claims may be presented to the other party's web site by running a "selector" application on the individual's communication device. The claims may be presented to different other parties by presenting the card to the parties. It may be unnecessary to key in the claim information for each of the other parties' web sites. Virtual identification cards, however, do not provide for the execution of a transaction.

It would therefore be desirable to provide apparatus and methods for exchanging transaction information in a more efficient and reliable manner.

SUMMARY OF THE INVENTION

Apparatus and methods in accordance with the principles of the invention may provide for the execution of a transaction between a customer and a merchant using a virtual purchasing instrument. The virtual purchasing instrument may provide the merchant with one or more of authentication of the customer's identity, funds availability or credit clearance, and authorization to execute an online transaction. The virtual purchasing instrument may provide the customer with the ability to execute the transaction in a manner that partly or wholly avoids keying in customer information or billing information. The apparatus and methods may involve receiving from the customer a request to pay funds or draw credit from an account based on the customer's electronic presentation of the virtual purchasing instrument to the merchant.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 9 shows other illustrative information that may be used in the execution of the transaction;

FIG. 10 shows yet other illustrative information that may be used in the execution of the transaction;

FIG. 13 shows illustrative information that may be used in the execution of the transaction;

DETAILED DESCRIPTION OF THE INVENTION

Figure 1:
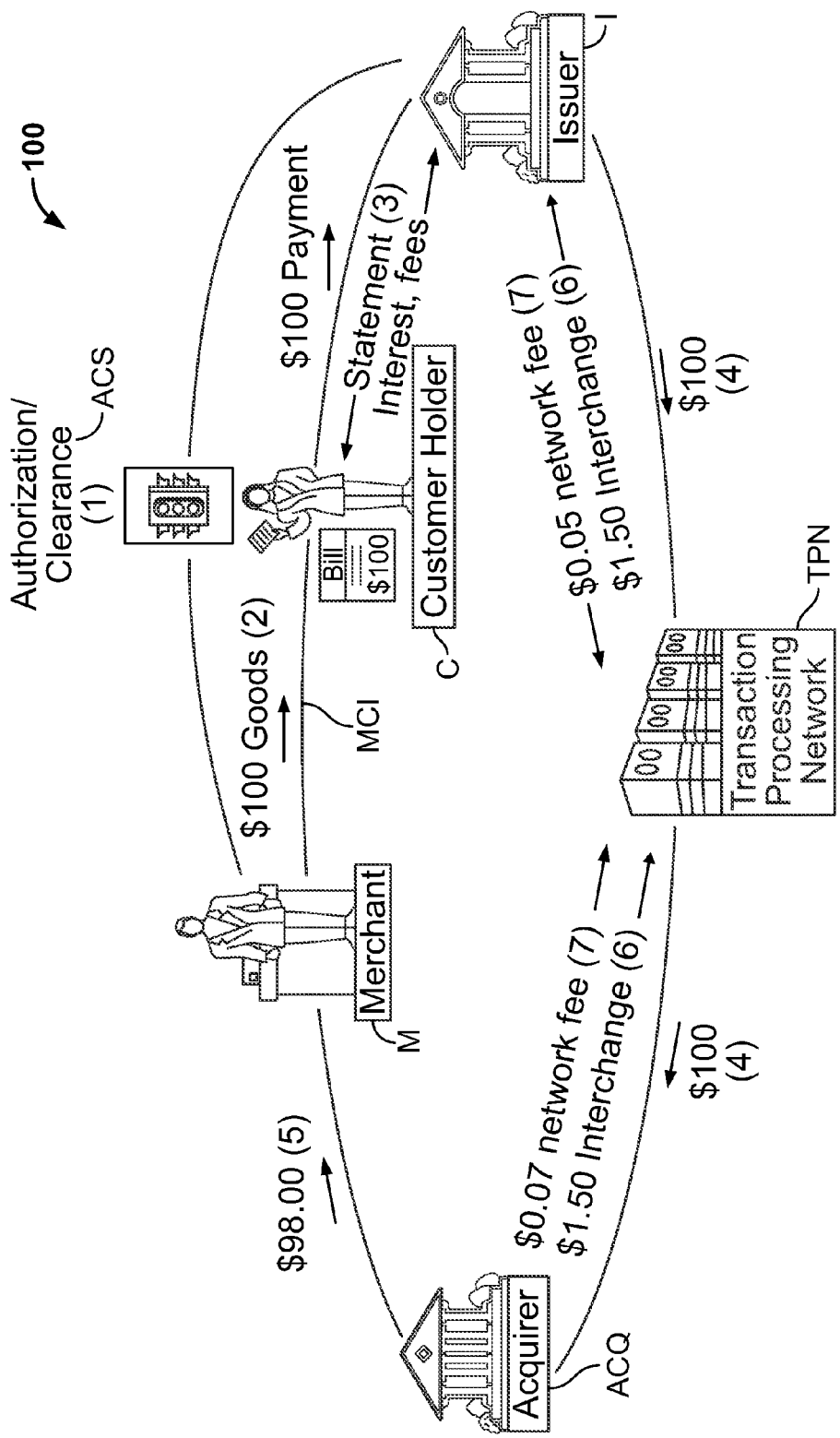
FIG. 1 shows an illustrative arrangement for executing a transaction.

Apparatus and methods in accordance with the principles of the invention may provide a virtual purchasing instrument for the execution of a transaction between a customer and a merchant. The apparatus and methods may involve an electronic receiver that is configured to receive from the customer a request to draw funds or credit from an account to pay for goods or services that are the subject of the transaction. The amount may correspond to a transaction that is executed using a virtual purchasing instrument account. The apparatus and methods may further involve an electronic transmitter. The transmitter may be configured to transmit to a customer device an electronic authentication form.

The virtual purchasing instrument may be provided to the customer to conduct transactions based on the virtual purchasing instrument account. The virtual purchasing instrument account may be a credit account, a checking account, a savings account or any other suitable account. The virtual purchasing instrument may be a virtual credit card, a virtual debit card or a virtual version of any other suitable card for transactions, whether cashless or cash-based. The virtual purchasing instrument may be an electronic file that is stored on a customer device.

The virtual purchasing card may be issued to the customer based on authenticated customer identity information. The virtual purchasing card may be issued to the customer based on verified customer authorization to use funds or draw credit. The virtual purchasing card may be an electronic file that includes encrypted customer and account information. The encrypted customer and account information, and associated information, may be presented to the merchant via the merchant's web site. The customer and account information may be formatted such that the web site can receive the information with some customer keyboarding or no customer keyboarding of the information. The virtual purchasing card may be activated in connection with the merchant's web site, from a customer device, by selection of the virtual purchasing instrument using a selector application.

The receiver may receive authentication for the transaction based on the form. The authentication may be performed by the customer. The transmitter may transmit to the merchant authorization to charge the amount to the credit account. The authorization may be based on the authentication. The receiver may receive a digital signature from the customer. The authorization may be based on the digital signature.

In some embodiments, the receiver may be configured to receive an electronic acknowledgment of an interchange fee, payable by an acquirer to an issuer, in connection with the transaction.

In some embodiments, the transmitter may transmit the authorization to the merchant via a customer device. For example, the transmitter may transmit the authorization to a customer communication device such as a telephone, a personal data assistant or a personal computer.

In some embodiments, the apparatus may include a processor that is configured to execute a transaction clearance process that determines whether the customer has sufficient credit to cover the amount.

In some embodiments, the processor may be configured to formulate a communication that commits to the payment of funds in the amount of the transaction to the merchant, the merchant's acquirer or any other suitable party.

The apparatus and methods may provide for issuing to a customer a virtual purchasing card. The receiver may be configured to receive, from the customer, customer information and a request to issue the virtual purchasing card. The virtual purchasing card may have at least one claim value. The claim value may correspond to a name of the customer. The claim value may correspond to a billing address of the customer.

The processor may be configured to set the claim value. The apparatus and methods may also involve machine readable memory that is configured for registering the virtual purchasing card.

In some embodiments, the processor may logically link the virtual purchasing card to a credit card account; verify the customer information using financial institution information; or logically link the virtual purchasing card to an electronic communication device identifier. The electronic communication device identifier may be a telephone number.

The apparatus and methods may provide for issuing to a customer a virtual loan preapproval certificate. The virtual loan preapproval certificate may be issued by a financial institution to a customer. The certificate may be stored on a mobile communication device and electronically transmitted to other parties associated with a transaction. The receiver may be configured to receive from the customer: customer information; and a request to issue the virtual loan preapproval certificate. The virtual loan preapproval certificate may have at least one claim value. The processor may be configured to set the claim value based on the customer information. The machine readable memory configured for registering the virtual loan preapproval certificate.

In some embodiments, the receiver may be configured to receive a customer social security number and a credit bureau report corresponding to the customer. The receiver may be configured to receive from the customer a selection of a loan term.

In some embodiments, the processor may be configured to verify the customer information using financial institution information. The processor may be configured to logically link the virtual loan preapproval certification to an electronic communication device identifier. The processor may be configured to assign a loan amount to the claim value. The processor may be configured to assign a down payment amount to the claim value.

The apparatus and methods may provide for issuing to a customer a virtual customer benefit card. The virtual customer benefit card may be issued by a customer benefit program such as an e-coupon program or a loyalty program. The customer may use the customer benefit card to obtain customer benefits in connection with an online transaction with a merchant. The transmitter may be configured to transmit, to the customer, benefit program identification information. The receiver may be configured to receive, from the customer, a selection of the benefit program and benefit program customer identification information that is based on the customer's membership in the benefit program. The processor may be configured to set a claim value for the virtual customer benefit card. The claim value may correspond to the benefit program customer identification information.

In some embodiments, the transmitter may be configured to transmit to the customer the claim value after the claim value is set by the processor.

In some embodiments, the receiver may be configured to receive from the customer an instruction to configure the virtual customer benefit card to instruct a merchant to apply a customer benefit to a transaction. The customer benefit may be a purchase price discount. The customer benefit may be a reward based on a purchase price.

In some embodiments, the processor may be configured, when the claim value is a first claim value, to set a second claim value to correspond to a credit account identifier that corresponds to the customer.

In some embodiments, when the benefit program information corresponds to a first customer benefit program, the receiver may be configured to receive, from a provider of a second customer benefit program, second benefit program identification information corresponding to the second customer benefit program. The transmitter may be configured to transmit to the customer the second benefit program identification information. The receiver may be configured to receive, from the customer, a selection of the second benefit program and second benefit program customer identification information based on the customer's membership in the benefit program. The processor may be configured to set a claim value for the virtual customer benefit card. The claim value may correspond to the second benefit program customer identification information.

When a transaction occurs between the customer and the merchant, transaction information regarding the transaction may be exchanged between transaction participants. The transaction information may include any information that is communicated, or would be appropriate to communicate, from one transaction participant to another transaction participant in connection with a transaction between the customer and the merchant. The transaction information may include customer information. The transaction information may include billing information. Table 1 shows illustrative transaction participant types.

TABLE 1

Illustrative transaction participant types.

Illustrative Transaction Participant Types

Merchant
Customer
Authorization service
Clearance service
Issuer
Network
Acquirer More than one participant of a given type may be available to participate in a transaction. Different participants of the same type may have advantages and/or disadvantages relative to the other participants of that type. For example, one issuer may be a member of a lending consortium while another is not a member, one network may require payment of a small interchange fee while another network requires payment of a large interchange fee, and the like.

Different transaction participants may provide different transaction services. For example, the transaction services may include the transaction services (and any associated activities) shown in FIG. 1 or listed in Table 2.

TABLE 2

Illustrative transaction services.

Illustrative Transaction Service

Sale of goods to customer
Authorization of customer credit
Clearance of customer credit
Notice of customer balance
Invoice of customer for bank service
Invoice of network fee
Invoice of interchange fee
Matching of acquirer and issuer
Acquisition of goods Each of the transaction services may be performed by a transaction participant. In some circumstances, a participant may perform more than one of the services. Each participant may charge a fee for providing the service. The fee may be charged to one or more of the other participants (as shown in FIG. 1). Thus, for each transaction, a participant may be required to pay (or collect), in sum, a "net" fee. The rule may require that the net fee for a designated participant conform to a requirement. For example, the rule may require that the participants be chosen such that the customer is assessed a minimum fee based on the transaction services to be provided.

The transaction may be performed using a purchasing instrument. The purchasing instrument may be a virtual purchasing instrument, such as a payment card, a virtual debit card, a virtual credit card or any other suitable virtual instrument. The virtual instrument may be operated on any suitable platform, such as a contactless chip, such as an ISO14443-compliant contactless chip, a cell phone, a personal data assistant or any other suitable electronic device.

The customer may select a virtual purchasing instrument that is associated with an issuer. The customer may select a signature-based transaction. The customer may select a PIN-based transaction.

Figure 2:
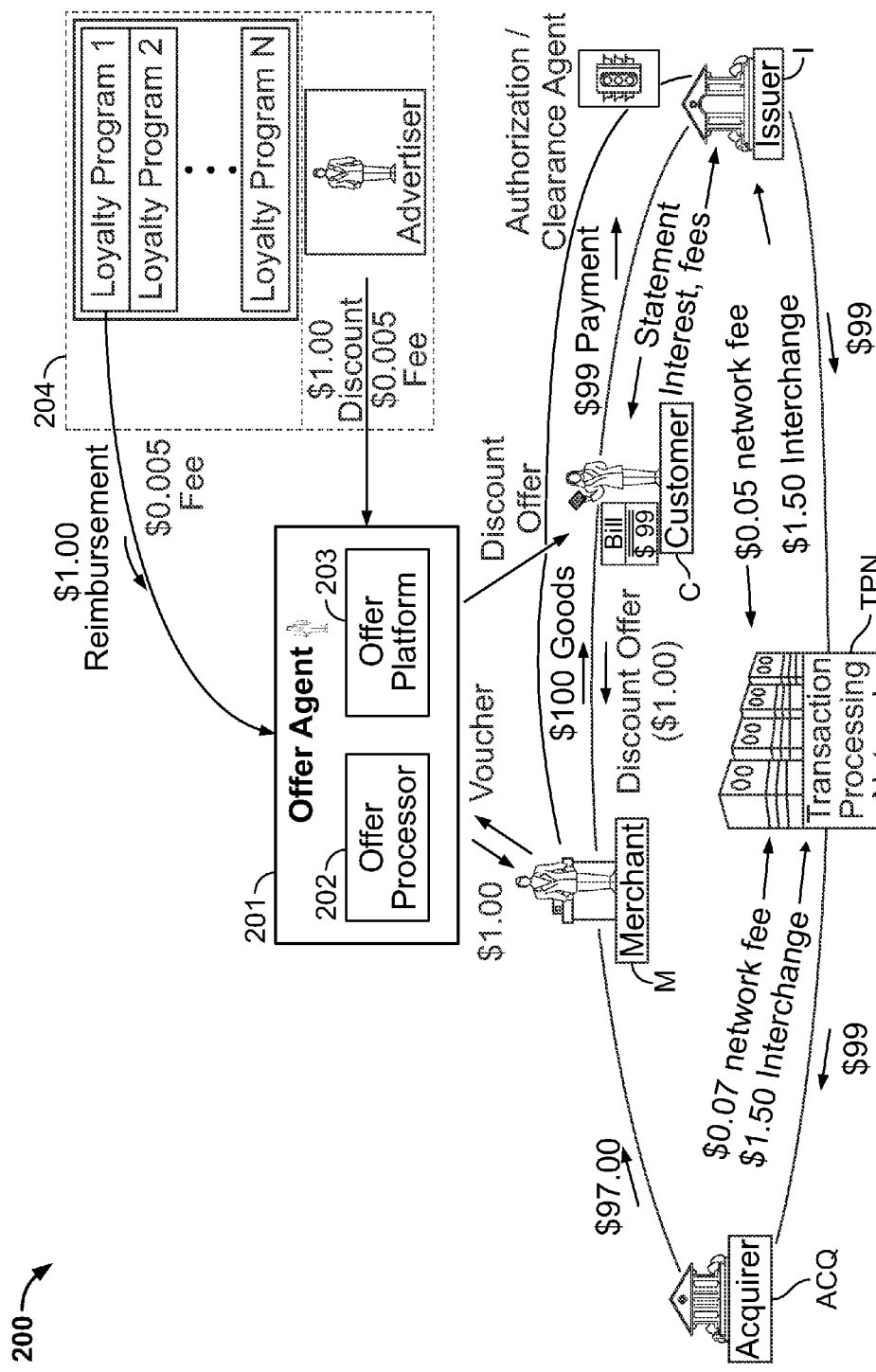
FIG. 2 shows another illustrative arrangement for executing a transaction.

FIG. 2 shows illustrative arrangement 200 for executing a transaction between customer C and merchant M. Arrangement 200 may include offer agent 201. Offer agent 201 may control offer processor 202 and offer platform 203. Offer processor 202, in conjunction with offer platform 203, may provide customer C with a discount offer. Offer Customer C may present the discount offer to merchant M to offset the purchase price of goods. Merchant M may provide the goods to customer C based on acquisition of the goods by acquirer ACQ, a credit relationship between customer C and issuer I, and a settlement relationship between issuer I and acquirer ACQ. (The settlement relationship may be based on a transaction processing network, as shown in FIG. 2, or any other suitable settlement relationship).

Merchant M may provide a voucher to offer processor 202. Offer processor 202 may effect reimbursement of merchant M in the amount of the discount offer. FIG. 2 illustrates the discount offer as $1.00. Offers sources 204 may provide discount offers to offer agent 201. Offer agent 201 may provide the discount offers to customer C. Customer C may select the discount offers that customer C desires. The desired discount offers may be stored in an account on offer platform 203 for later use by customer C. In some embodiments, the discount offers may be pushed into the account without customer C's selection. In such embodiments, customer C may redeem at a POS terminal (e.g., of merchant M) some or all of the coupons in customer C's account that are valid for goods that merchant M processes (e.g., at "register check-out") for purchase by customer C.

Offer sources may include one or more of a loyalty program, an advertiser, a consumer packaged goods manufacturer, a retailer, a bank, a restaurant or any other suitable entity. FIG. 2 shows that an offer source may provide a monetary reimbursement to the offer platform (e.g., $1.00, as illustrated). The offer source may also pay a fee to the offer platform (e.g., $0.005, as illustrated). The reimbursement funds and fees may be routed in any suitable manner, and in any suitable proportions, to any of the participants in the transaction.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 3:
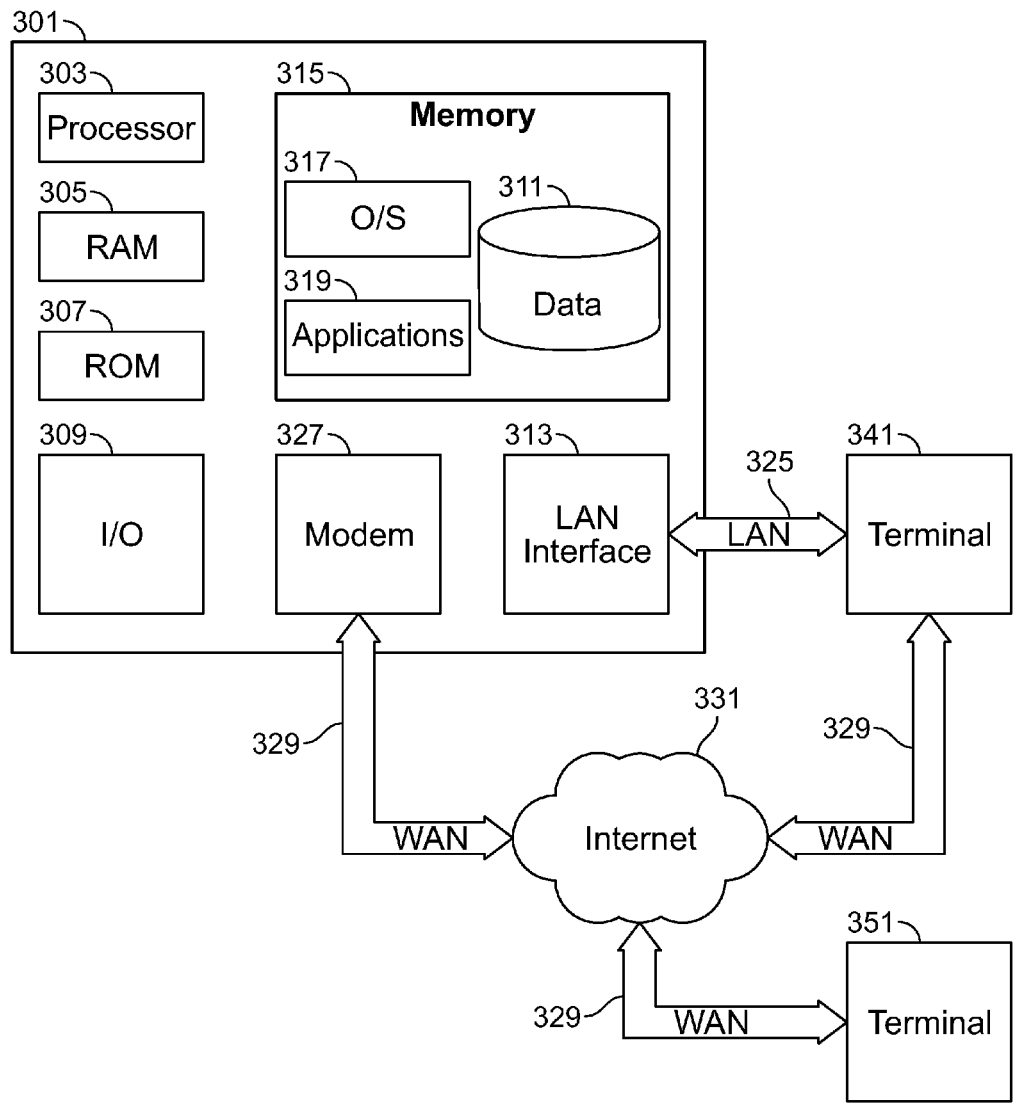
FIG. 3 shows illustrative apparatus that may be used to execute a transaction.

FIG. 3 is a block diagram that illustrates a generic computing device 301 (alternatively referred to herein as a "server") that may be used according to an illustrative embodiment of the invention. The computer server 301 may have a processor 303 for controlling overall operation of the server and its associated components, including RAM 305, ROM 307, input/output module 309, and memory 325. Server 301 may include one or more receiver modules, server modules and processors that may be configured to transmit and receive transaction information, issue virtual purchasing instruments, issue virtual loan preapproval certificates, issue virtual customer benefit cards and perform any other suitable tasks related to routing transaction information.

Input/output ("I/O") module 309 may include a microphone, keypad, touch screen, and/or stylus through which a user of device 301 may provide input, and may also include one or more of a speaker for providing audio output and a video display device for providing textual, audiovisual and/or graphical output. Software may be stored within memory 325 and/or storage to provide instructions to processor 303 for enabling server 301 to perform various functions. For example, memory 325 may store software used by server 301, such as an operating system 317, application programs 319, and an associated database 321. Alternatively, some or all of server 301 computer executable instructions may be embodied in hardware or firmware (not shown). As described in detail below, database 321 may provide storage for customer information, virtual purchasing instrument records, virtual loan preapproval certificate records, virtual customer benefit card information and any other suitable information.

Server 301 may operate in a networked environment supporting connections to one or more remote computers, such as terminals 341 and 351. Terminals 341 and 351 may be personal computers or servers that include many or all of the elements described above relative to server 301. The network connections depicted in FIG. 3 include a local area network (LAN) 325 and a wide area network (WAN) 329, but may also include other networks. When used in a LAN networking environment, computer 301 is connected to LAN 325 through a network interface or adapter 323. When used in a WAN networking environment, server 301 may include a modem 327 or other means for establishing communications over WAN 329, such as Internet 331. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 319, which may be used by server 301, may include computer executable instructions for invoking user functionality related to communication, such as email, short message service (SMS), and voice input and speech recognition applications.

Computing device 301 and/or terminals 341 or 351 may also be mobile terminals including various other components, such as a battery, speaker, and antennas (not shown).

Terminal 351 and/or terminal 341 may be portable devices such as a laptop, cell phone, blackberry, or any other suitable device for storing, transmitting and/or transporting relevant information.

Any information described above in connection with database 321, and any other suitable information, may be stored in memory 325.

One or more of applications 319 may include one or more algorithms that may be used to perform one or more of the following: issue virtual purchasing instruments, authorize online transactions, issue virtual loan preapproval certificates, issue virtual customer benefit cards and perform any other suitable tasks related to routing transaction information.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Figure 4:
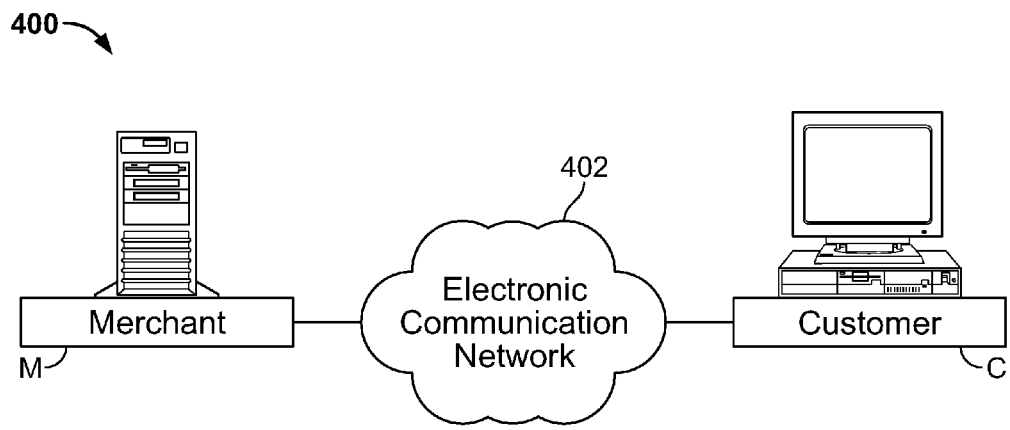
FIG. 4 shows yet another illustrative arrangement for executing a transaction.

FIG. 4 shows illustrative arrangement 400 for the online execution of a transaction between merchant M and customer C (as shown in FIGS. 1 and 2). Merchant M and customer C may communicate via electronic communication network 402.

Figure 5:
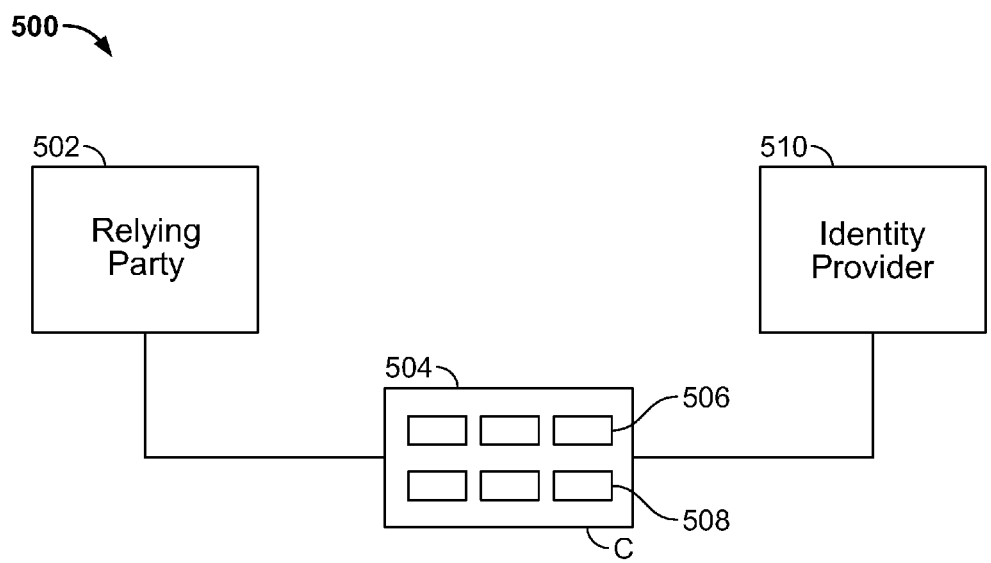
FIG. 5 shows still another illustrative arrangement for executing a transaction.

FIG. 5 shows illustrative arrangement 500 that merchant M may use to authenticate the identity of customer C in arrangement 400. Arrangement 500 is a virtual identity card arrangement such as that formulated by the Information Card Foundation (See www.informationcard.net). Merchant M may correspond to relying party 502.

Customer C may use browser-based selector 504 to select one or more of virtual cards 506 for presentation to merchant M. Virtual card 508, e.g., may be issued by identity provider 510. Identity provider 510 may have verified the identity of customer C. Identity provider 510 may have issued virtual card 508 to customer C in a manner that merchant M will rely on virtual card 508 for the authentication of customer C.

Virtual card 508 may include one or more "claims." The claim may include customer information. The claim may include billing information. Virtual card 508 may provide merchant M with credit card account information that merchant M can use to execute an online transaction with customer C. Identity provider 510 may be a credit issuer.

Figure 6:
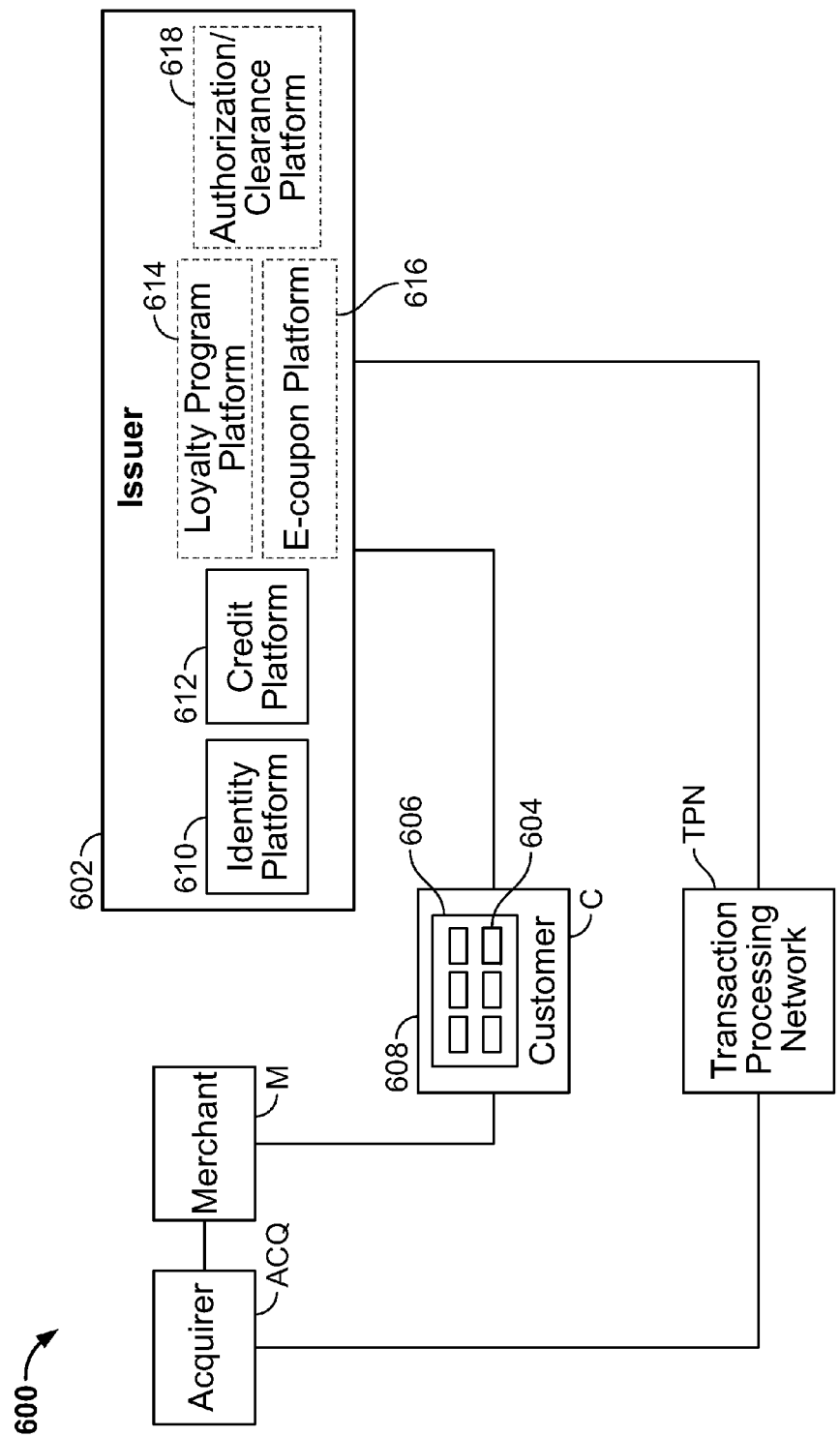
FIG. 6 shows still another illustrative arrangement for executing a transaction.

FIG. 6 shows illustrative arrangement 600 for executing an online transaction and providing supplemental services. Arrangement 600 may support a transaction between customer C and merchant M. In some embodiments, the transaction may involve issuer 602, transaction processing network TPN and acquirer ACN. In some embodiments, one or more acquirer ACQ function may be performed by issuer 602. In some embodiments, transaction processing network TPN may not be involved in the transaction.

Customer C may execute the transaction using virtual purchasing instrument 604 via selector program 606 on customer client device 608.

Virtual purchasing instrument 604 may be issued by issuer 602. Issuer 602 may use virtual purchasing instrument 604 to provide to customer C one or more of identity authentication, credit, loyalty program services, electronic coupons and transaction authorization, along with any suitable services. Identity platform 610 may provide identity authentication to customer C. Credit platform 612 may provide access to customer C's bank and credit accounts. Credit platform 612 may be configured to receive from customer C one or more instructions to link one or more identified accounts to virtual purchasing instrument 604. For each of the accounts, the instructions may include a transaction dollar limit at which the virtual purchasing instrument may be used.

Loyalty program platform 614 may provide access to loyalty program member benefits. E-coupon platform 616 may facilitate the customer's use of e-coupons during online shopping on the merchant's web site. Authorization/clearance platform 618 may require customer authorization and sufficient funds for the transaction. The functions of one or more of platforms 610, 612, 614, 616 and 618 may be performed by one or more devices such as those shown in FIG. 3.

Processes in accordance with the principles of the invention may include one or more features of the process illustrated in FIGS. 7, 12, 16 and 17. For the sake of illustration, the steps of the process illustrated in FIGS. 7, 12, 16 and 17 will be described as being performed by a "system". The "system" may include one or more of the features of the apparatus that are shown in FIG. 3 and/or any other suitable device or approach. The "system" may be provided by an entity. The entity may be an individual, an organization or any other suitable entity.

Figure 7:
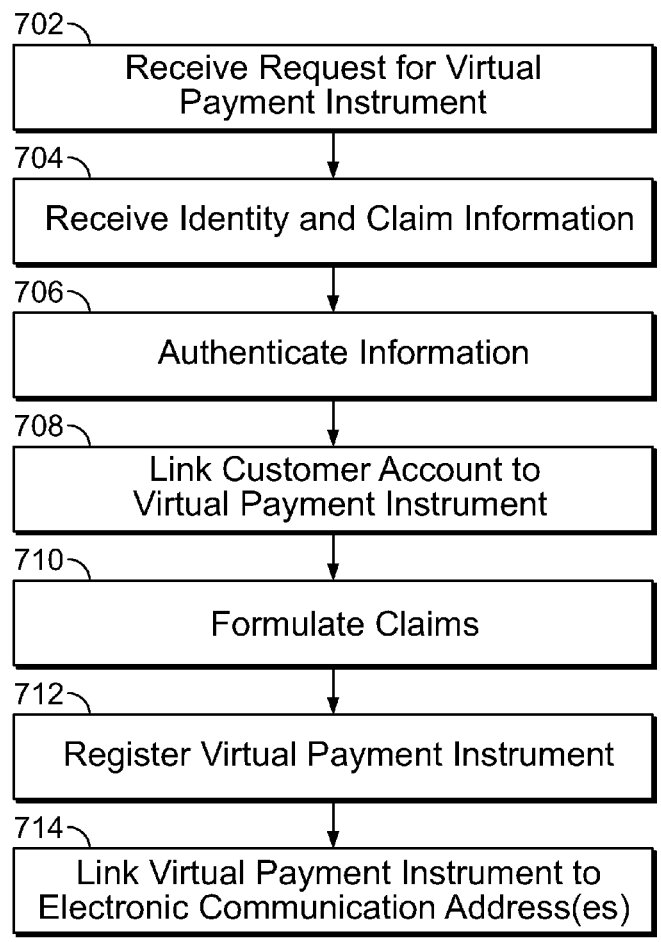
FIG. 7 shows illustrative steps of a method for executing a transaction.

FIG. 7 shows illustrative process 700 for issuing a virtual purchasing instrument such as virtual purchasing instrument 604 (shown in FIG. 7). Process 700 may begin at step 702. At step 702, the system may receive an electronic request from a customer for the virtual purchasing instrument. At step 704, the system may receive identity and claim information from the customer. The identity information may include documentation and information in support of the customer's identity. The claim information may include any information that the customer elects to present to a merchant when the virtual purchasing card is used in a transaction with the merchant. The claim information may correspond to "claims" in a virtual identity card. The system may verify none, some or all of the claim information. The system may certify none, some or all of the claim information.

At step 706, the system may authenticate the identity information. At step 708, the system may link customer account information to the virtual purchasing instrument.

At step 710, the system may formulate claims for the virtual purchasing instrument. The claims may be based on the claim information (e.g., from step 704). The claims may be based on issuer information (e.g., account information, issuer certification of customer claim information, issuer identification information and any other suitable information).

At step 712, the system may register the virtual purchasing instrument. The system may register the virtual purchasing instrument in an electronic register.

At step 714, the system may link the virtual purchasing instrument to one or more electronic communication address.

The electronic communication address may be used to request customer authorization for a transaction, to notify the customer about activities involving the virtual purchasing instrument, to provide to the customer a new or revised virtual purchasing instrument, to provide to the customer an electronic coupon, a customer benefit or a loan preapproval certification, or for any other suitable purpose.

The electronic communication address may be an email address, a telephone number, a PIN number or any other suitable address.

FIGS. 8-11 show illustrative views of web pages that may be used in conjunction with process 700 (shown in FIG. 7).

Figure 8:
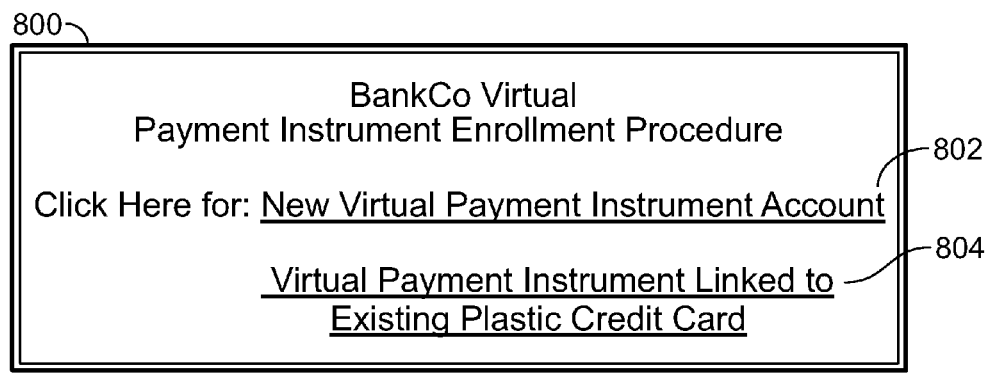
FIG. 8 shows illustrative information that may be used in the execution of the transaction.

FIG. 8 shows illustrative view 800. View 800 may include link 802. Customer C may select link 802 to apply for a new virtual purchasing instrument and associated account. The new virtual purchasing instrument account may be a credit account, a debit account, a checking account or any other suitable account. The new virtual purchasing instrument account may be issued based on criteria that are similar to those used to grant credit for a standard credit card or other suitable criteria.

View 800 may include link 804. Customer C may select link 804 to apply for a virtual purchasing instrument that is linked to an existing account. The virtual purchasing instrument may be used as a credit card, a debit card an electronic check or any other suitable instrument.

FIG. 9 shows view 900. In some embodiments, view 900 may be displayed if customer C selects link 804 (shown in FIG. 8). View 900 instructs customer C to select an existing customer C account for which customer C would like to obtain a virtual purchasing instrument.

FIG. 10 shows view 1000. In some embodiments, view 1000 may be displayed if customer C selects either link 802 or 804 (shown in FIG. 8). View 1000 informs customer C that the virtual purchasing instrument ("VPI," in FIG. 10) will include claims having customer information 1002 and 1004 and account information 1006 and 1008. The customer and account information may be presented to merchant M when customer C electronically presents the virtual purchasing instrument to merchant M. In some embodiments, the claims may be presented to merchant M by selector 606 (shown in FIG. 6).

Figure 11:
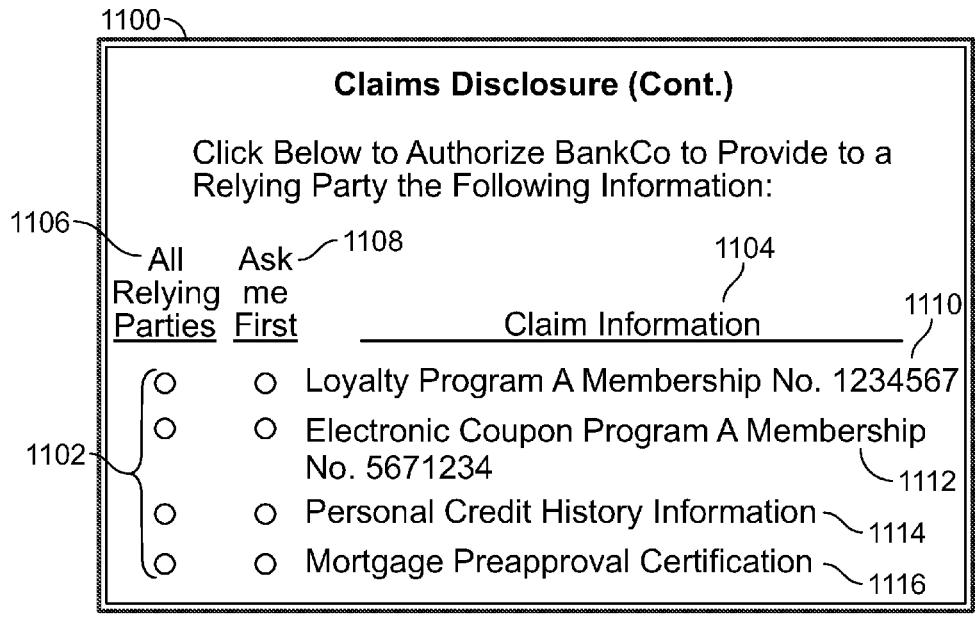
FIG. 11 shows still other illustrative information that may be used in the execution of the transaction.

FIG. 11 shows view 1100. In some embodiments, view 1100 may be displayed to provide customer C with one or more of controls 1102 for selecting one or more items of claim information 1104 for disclosure to merchant M. In some embodiments, an item of claim information 1104 may be selected for disclosure to "ALL RELYING PARTIES" 1106. In some embodiments, an item of claim information 1104 may be selected for conditional disclosure ("ASK ME FIRST" 1108) to relying parties.

Claim information 1104 may include, for example, customer C's Loyalty Program A membership number 1110, customer C's Electronic Coupon Program A membership number 1112, personal credit history information (about customer C) 1114, and customer C's mortgage preapproval certification 1116. In some embodiments, virtual purchasing instrument 604 (shown in FIG. 6) may be a virtual loan preapproval certificate. In those embodiments, the system may electronically request from customer C financial information related to a prospective loan-based transaction. Customer C may provide the information. The system may process the information using appropriate evaluation protocols. If the loan is pre-approved, the system may issue to the customer the virtual loan pre-approval certificate. The customer may electronically present the certificate to a real estate agent, broker, seller or other suitable individual or entity via a selector. The selector may be present on any of the devices shown in FIG. 3 or described in connection therewith or any other suitable device. For example, the selector may be present on a PDA such that the customer may present the certificate to an agent during a visit to a home or property for prospective acquisition.

Figure 12:
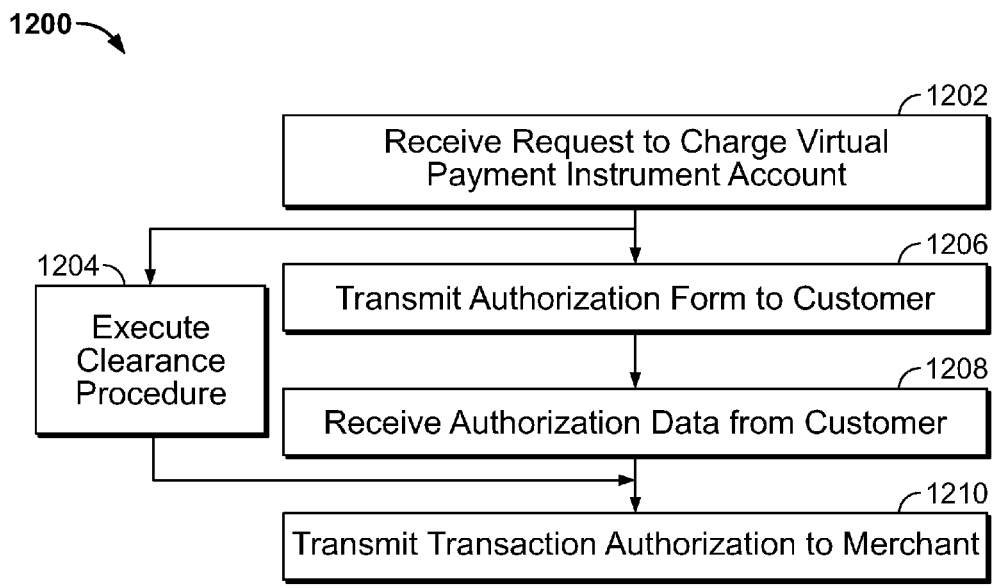
FIG. 12 shows illustrative steps of another method for executing a transaction.

FIG. 12 shows illustrative process 1200 for executing an electronic transaction using a virtual purchasing instrument such as virtual purchasing instrument 604 (shown in FIG. 7). Process 1200 may begin at step 1202. At step 1202, the system may receive a request to charge a virtual purchasing instrument account. The system may receive the request from customer C. The system may receive the request from merchant M. The system may receive the request from merchant M on behalf of customer C. The virtual purchasing instrument account may be linked to a virtual purchasing instrument such as 604.

At step 1204, the system may execute a clearance procedure that ascertains whether customer C has sufficient funds or credit to cover the transaction. At step 1206, the system may transmit to customer C an authorization form. Customer C may use the authorization form to authorize use of the funds or credit. At step 1208, the system may receive from customer C authorization data from the authorization form. At step 1210, the system may transmit transaction authorization to merchant M.

Figure 14:
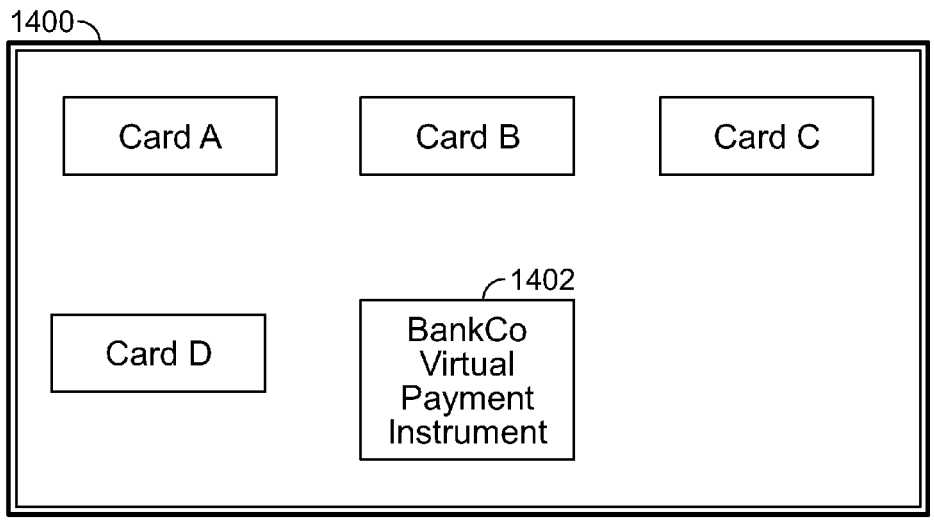
FIG. 14 shows other illustrative information that may be used in the execution of the transaction.
Figure 15:
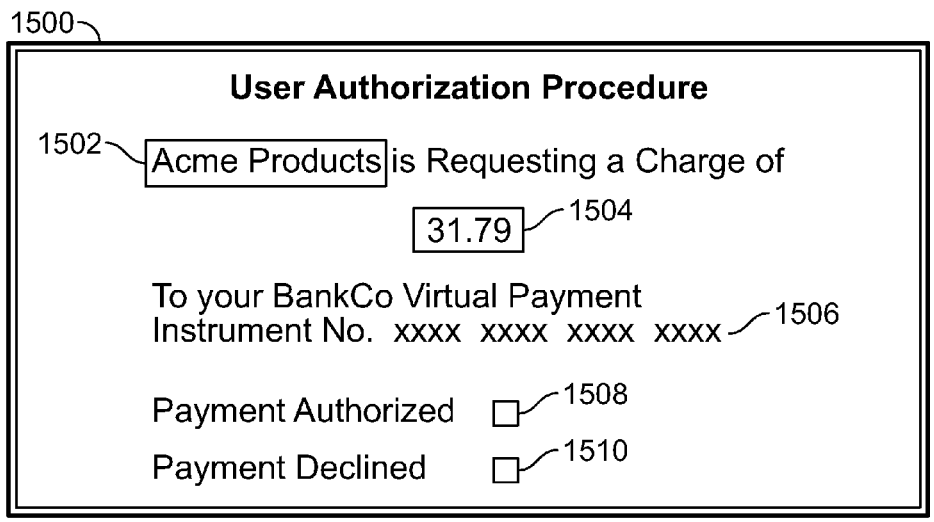
FIG. 15 shows yet other illustrative information that may be used in the execution of the transaction.

FIGS. 13-15 show illustrative views of web pages that may be used in conjunction with process 1200 (shown in FIG. 12).

FIG. 13 shows illustrative view 1300. View 1300 may display information about items (e.g., Nos. 1-3) in an online shopping cart. For each item, view 1300 may include one or more of SKU number 1302, item description 1304, quantity 1306 to be purchased, regular price 1308 and amount 1310. In some embodiments, view 1300 may include Loyalty Program A discounted price 1312. In some embodiments, view 1300 may include E-coupon Program A discounted price 1314.

In some embodiments, view 1300 may include instruction 1316 to customer C to select a payment instrument. The choices of payment instrument may include choice 1318 for payment by virtual purchasing instrument.

In some embodiments, customer C may present the virtual purchasing instrument to merchant M prior to the display of view 1300. In those embodiments, discounts such as those identified in connection with Loyalty Program A 1312 and E-coupon program A 1314, may be included in view 1300 based on information included in the virtual purchasing card. For example, the system may identify and present discounts based on claim information such as 1110 and 1112 (shown in FIG. 11).

FIG. 14 shows view 1400 of a selector such as 606 (shown in FIG. 6). The system may display view 1400 in response to the selection by customer C of choice 1318 (shown in FIG. 13). Customer C may use view 1400 to select a virtual purchasing instrument such as virtual purchasing instrument 1402. The selector may include one or more virtual identification cards such as Cards A-D. Cards A-D may include one or more cards formulated by customer C. Cards A-D may include one or more managed cards. In some embodiments, virtual purchasing instrument 1402 may have one or more features of a managed card.

FIG. 15 shows illustrative view 1500. The system may present view 1500 to customer C in connection with step 1206 of process 1200 (shown in FIG. 12). View 1500 may provide customer C with identity 1502 of merchant M, amount 1504 of the transaction (also appearing in connection with amount 1310 in FIG. 13). View 1500 may include identity 1506 of customer C's virtual purchasing instrument. View 1500 may include controls 1508 and 1510 for authorizing and declining payment of amount 1504, respectively.

Figure 16:
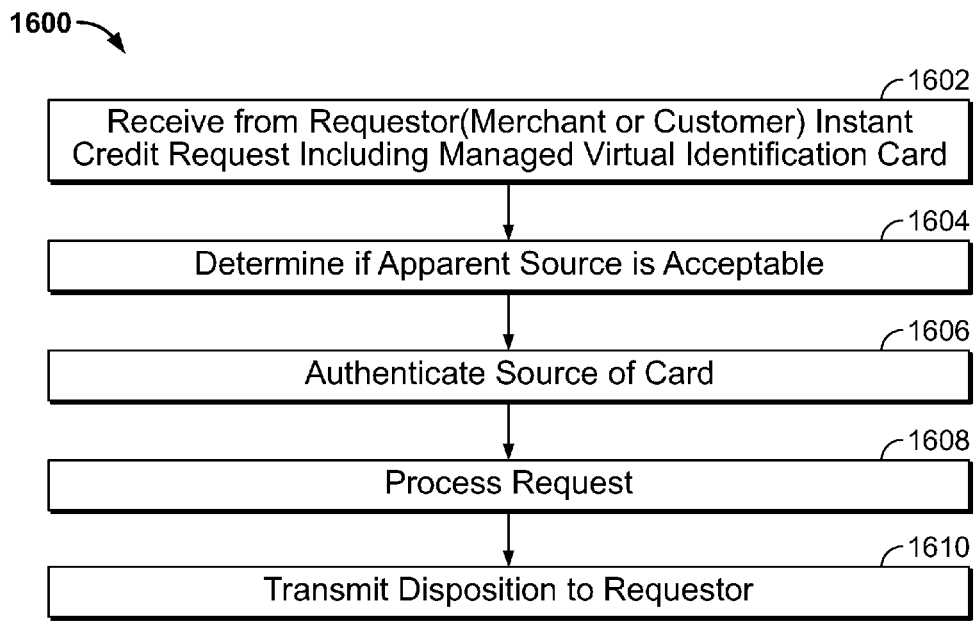
FIG. 16 shows illustrative steps of still another method for executing a transaction.

FIG. 16 shows illustrative process 1600 for issuing instant or "on-the-spot" credit to customer C. Process 1600 may begin at step 1602. At step 1602, the system may receive a request from customer C for instant credit. In some embodiments, the system may receive the request from merchant M. In some embodiments, the system may receive the request from merchant M on behalf of customer C. In some embodiments, customer C may not possess a virtual purchasing instrument issued by the entity that controls the system (for example, issuer 602, shown in FIG. 6). In those embodiments, step 1602 may include receiving from customer C a managed virtual identification card. The managed virtual identification card may include certified information regarding customer C's credit worthiness. The certified information may have been certified by an identified certifying party.

At step 1604, the system may determine whether to rely on the certification. For example, the system may include a list of identity providers upon which the system is to rely. If customer C presents a managed virtual identification card that was issued by an identity provider that is not listed, the system may deny customer C's request at step 1604.

At step 1606, the system may use a digital signature or public key to the source of the card. For example, the system may use process a digital signature or use a public key to confirm that the card was indeed issued by the identity provider that is patently identified in connection with the card.

The system may rely on the card for authentication of customer C's identity. In some embodiments, the system may undertake supplemental steps to authenticate customer C's identity. For example, the system may ask customer C one or more "out-of-wallet" questions, such as "WHAT ARE THE MAKE AND MODEL OF A VEHICLE FOR WHICH YOU RECEIVED AN AUTOMOBILE PURCHASE LOAN IN 2007?", "WHAT IS THE BALANCE OF YOUR MONEY MARKET ACCOUNT," "WHAT IS THE AMOUNT OF YOUR LAST PAYMENT ON A CREDIT CARD ACCOUNT THAT HAS A NUMBER ENDING IN 8765?" and the like.

At step 1608, the system may process the request for instant credit. The process may involve determining whether customer C satisfies credit behavior and financial status requirements. The system may determine that customer C's credit behavior and financial status requirements are satisfied based on credit and financial records that the system has permission to access. For example, when customer C is an existing customer of the entity that governs the system, the system may have access to at least a portion of customer C's credit behavior and financial status information.

At step 1610, the system may transmit a disposition of the request to customer C or merchant M.

Figure 17:
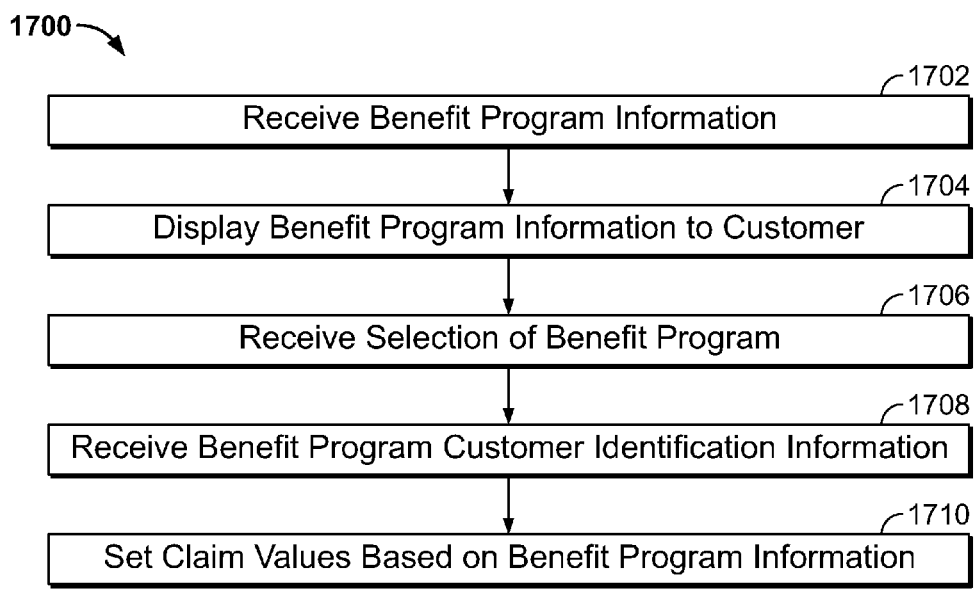
FIG. 17 shows illustrative steps of yet another method for executing a transaction.

FIG. 17 shows illustrative process 1700 for enrolling a customer in a benefit program in connection with the issuance or maintenance of a virtual purchasing instrument. Process 1700 may begin at step 1702. At step 1702, the system may receive benefit program information from a benefit program administrator. The benefit program information may include a program name, information regarding the value of benefits, the goods and services for which benefits are available, the requirements for membership in the program and the like.

At step 1704, the system may display some or all of the benefit program information for one or more benefit programs to customer C.

At step 1706, the system may receive a selection of one or more of the benefit programs from customer C. At step 1708, the system may receive from customer C customer C's membership identification information for each benefit program that was selected. In some embodiments, the system may verify the membership identification information by communicating with the benefit program administrator.

At step 1710, the system may set virtual purchasing instrument claim values based on the benefit program information. In some embodiments, the claims may be set in accordance with the principles discussed in connection with FIG. 11.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for exchanging transaction information have been provided. Persons skilled in the art will appreciate that the present invention can be practiced by other than the described embodiments, which are presented for purposes of illustration rather than of limitation. The present invention is limited only by the claims that follow.

What is claimed is:

1. An apparatus for executing a transaction between a customer and a merchant, the apparatus comprising:
    an electronic receiver of an issuer system configured to receive from the merchant, via a transmission path that bypasses a transaction processing network, a request to charge an amount to a credit account, the amount corresponding to a transaction executed using a virtual purchasing instrument of the customer, the virtual purchasing instrument issued by an identity platform of the issuer system, wherein the identity platform is not the customer and not the merchant;
    a processor of the issuer system configured to perform, in response to receiving the request to charge the amount to the credit account, a clearance procedure that determines whether the customer has sufficient credit to cover the amount; and
    an electronic transmitter of the issuer system configured to transmit, in response to receiving the request to charge the amount to the credit account, an authorization-of-use request to a customer device; wherein:
        the receiver is further configured to receive, from the customer device, authorization to execute the transaction between the merchant and the customer based on a digitally signed identity claim associated with the virtual purchasing instrument, the digitally signed identity claim containing customer or billing information used for authenticating the customer to the merchant;
        the digitally signed identity claim is authenticated by the identity platform prior to receipt of the request to charge the credit account;
        based on the identity claim and a result of the clearance procedure, the transmitter is further configured to transmit to the merchant, via the transmission path that bypasses the transaction processing network, an authorization to charge the amount to the credit account; and
        the processor is further configured to commit to a payment of funds to the merchant, the funds being equivalent to the amount.

2. The apparatus of claim 1, wherein the receiver is further configured to receive from the customer device a digital signature.

3. The apparatus of claim 1, wherein the transmitter is further configured to transmit the authorization to the merchant through the customer device.

4. The apparatus of claim 1, wherein the processor commits to the payment of the funds to the merchant through an acquirer associated with the merchant.

5. The apparatus of claim 4, wherein the receiver is further configured to receive an electronic acknowledgment of an interchange fee, payable by the acquirer to the issuer, due in connection with the transaction.

6. One or more non-transitory computer-readable media storing computer-executable instructions which, when executed by a processor on an issuer computer system, perform a method for executing a transaction between a customer and a merchant, the method comprising:
   receiving from the merchant via a transmission path that bypasses a transaction processing network, a request to charge an amount to a credit account, the amount corresponding to a transaction executed using a virtual purchasing instrument of the customer, the virtual purchasing instrument issued by an identity platform of the issuer computer system, wherein the identity platform is not the customer and not the merchant;
   after receiving the request to charge the amount to the credit account, performing a transaction clearance process, using the processor, that determines whether the customer has sufficient credit to cover the amount;
   transmitting, in response to receiving the request to charge the credit account, an authorization-of-use request to a customer device;
   receiving from the customer device, in response to the authorization-of-use request, a digitally signed identity claim that:
      is associated with the virtual purchasing instrument;
      contains customer or billing information used for authenticating the customer to the merchant; and
      is authenticated by the identity platform prior to receiving the request to charge the credit account;
   transmitting to the merchant, based on the digitally signed identity claim and a result of the transaction clearance process, via the transmission path that bypasses the transaction processing network, authorization to execute the transaction; and
   providing funds to the merchant, the funds being equivalent to the amount.

7. The media of claim 6, wherein the method further includes receiving from the customer device a digital signature.

8. The media of claim 6, wherein transmitting to the merchant further comprises electronically transmitting the authorization to the merchant through the customer device.

9. The media of claim 6, wherein providing the funds to the merchant comprises providing the funds to an acquirer associated with the merchant.

10. The media of claim 9, wherein the method further comprises receiving an electronic acknowledgment of an interchange fee, payable by the acquirer to the issuer, due in connection with the transaction.

11. A method for executing a transaction between a customer and a merchant, the method comprising:
   receiving from the merchant, by an electronic receiver of an issuer system via a transmission path that bypasses a transaction processing network, a request to charge an amount to a credit account, the amount corresponding to a transaction executed using a virtual purchasing instrument of the customer, the virtual payment instrument issued by an identity platform of the issuer computer system, wherein the identity platform is not the customer and not the merchant;
   performing a transaction clearance process using a processor of the issuer system that determines whether the customer has sufficient credit to cover the amount after receiving the request to charge the amount to the credit account;
   in response to receiving the request to charge the amount to the credit account, transmitting to a customer device, using an electronic transmitter of the issuer system, an authorization-of-use request;
   receiving from the customer device, by the electronic receiver in response to the authorization of use request, a digitally signed identity claim that:
      is associated with the virtual purchasing instrument;
      comprises customer or billing information used for authenticating the customer to the merchant; and
      is authenticated by the identity platform prior to receiving the request to charge the credit account;
   transmitting, using the transmitter, to the merchant via the transmission path that bypasses the transaction processing network, authorization, based on the digitally signed identity claim and a result of the transaction clearance process, to execute the transaction; and
   providing funds to the merchant, the funds being equivalent to the amount.

12. The method of claim 11, wherein the method further includes, receiving, using the electronic receiver, from the customer device a digital signature.

13. The method of claim 11, wherein the transmitting to the merchant comprises transmitting the authorization to the merchant through the customer device.

14. The method of claim 11, wherein providing the funds to the merchant comprises providing the funds to an acquirer associated with the merchant.

15. The method of claim 14, further comprising electronically receiving an electronic acknowledgment of an interchange fee, payable by the acquirer to the issuer, due in connection with the transaction.

* * * * *